Sept. 12, 1972 E. RUDY 3,690,962
CARBIDE ALLOYS SUITABLE FOR CUTTING TOOLS AND WEAR PARTS
Filed Feb. 26, 1969 4 Sheets-Sheet 3

ERWIN RUDY INVENTOR,
BY J. Reid Anderson
Edward O. Ansell
ATTORNEYS

United States Patent Office 3,690,962
Patented Sept. 12, 1972

3,690,962
CARBIDE ALLOYS SUITABLE FOR CUTTING TOOLS AND WEAR PARTS
Erwin Rudy, Beaverton, Oreg., assignor to Aerojet-General Corporation, El Monte, Calif.
Filed Feb. 26, 1969, Ser. No. 802,625
Int. Cl. C22c 27/00, 29/00
U.S. Cl. 148—32
6 Claims

ABSTRACT OF THE DISCLOSURE

This invention relates to refractory metal bonded carbide alloys for use as cutting tools and in other applications where high hardness and abrasion resistance are required. The desired fine-grain, lamellar microstructure is obtained preferably by casting eutectic, or near-eutectic alloys of a Group IVa metal (titanium, zirconium, hafnium), tungsten and carbon which may contain certain alloying and inert materials. For selected applications, the composites may be fabricated by powder-metallurgical techniques.

---

The monocarbide phase contains significant amounts of both the tungsten and the Group IVa metal. In a preferred embodiment (hypereutectic composition) of the carbide composite of the invention, grains of primary carbide are dispersed throughout the lamellar microstructure. The interspersed primary carbide grains significantly improve the cutting action of the composite where employed in a machining tool.

The carbide alloys of the invention are made possible by the existence of a pseudobinary eutectic (see Table I) in the systems of Ti-W-C, Zr-W-C, and Hf-W-C. The solidification of the eutectic liquid provides a refractory metal phase and a monocarbide phase that are in solid state two-phase equilibria. The co-existence of the metal phase and the monocarbide phase in the solid state microstructure is necessary to the concept of metal-bonded carbide tool of the invention and the occurrence of the eutectic or near-eutectic reactions provides the means by which the desired microstructure possessing an extremely fine-grain, lamellar mixture of metal and monocarbide phases, can be obtained by melting and casting.

TABLE I
[Data for the pseudobinary eutectic equilibria in typical systems of Ti-W-C, Zr-W-C, and Hf-W-C]

| Alloy system | Eutectic temperature, °C. | Compositions (in atomic percent) | | |
|---|---|---|---|---|
| | | Eutectic liquid | Metal-ss (approximate) | Monocarbide-ss (approximate) |
| Ti-W-C | 2,700 | Ti(21)-W(57)-C(22) [1] | Ti(8)-W(92)-C(<0.5) | Ti(28)-W(33)-C(39) |
| Zr-W-C | 2,850 | Zr(25)-W(55)-C(20) [1] | Zr(3)-W(97)-C(<0.5) | Zr(44)-W(16)-C(40) |
| Hf-W-C | 2,980 | Hf(21)-W(61)-C(18) [1] | Hf(4)-W(96)-C(<1) | Hf(40)-W(20)-C(40) |

[1] Carbon concentrations, ±1 atomic percent; metal concentrations, ±2 atomic percent.

DISCUSSION OF THE PRIOR ART

Modern carbide tooling materials consist of a mechanically-pulverized, hard carbide phase dispersed in a matrix (binder) of an iron group metal, usually cobalt or nickel. The binder phase contributes toughness to the composite and also serves as an aid in sintering the carbide particles. The loss of strength of iron metal-based binder phases at relatively low temperatures can cause thermal wear to become the dominant wear mechanism at high cutting speeds, and the low melting temperatures of these binder phases also precludes their use as abrasion-resistant composites at temperatures above 800° C. to 1000° C.

Binderless, cast carbides such as $W_2C+WC$ eutectics played a role in the initial development of carbide-based tools and die materials, but became obsolete with the advent of the tougher, cobalt-bonded carbides fabricated by powder-metallurgical techniques.

Despite the attractive features of the casting process, including its adaptability to low cost manufacturing methods and need for only moderate capitalization, castable tooling materials of equivalent performance to the iron group metal bonded carbides were not developed.

DESCRIPTION OF THE INVENTION

The carbide composite materials of the invention have excellent thermal and mechanical shock resistance compared to the conventional cobalt-bonded carbide tool. This is achieved through the formation of a fine-grain, lamellar microstructure having a hard monocarbide phase and a tough refractory metal phase.

The carbide composite of the invention in a preferred embodiment comprises a base alloy system of a Group IVa metal (Ti, Zr or Hf), tungsten and carbon having a fine-grain, lamellar microstructure which is derived from a pseudobinary eutectic or near-eutectic composition. The lamellar microstructure possesses a monocarbide cutting phase and a metal phase with the latter phase being rich in tungsten and contributing toughness to the composite.

Alloy compositions from the Ti-W-C systems even when they are located somewhat off the eutectic composition will still solidify almost isothermally and thus produce acceptable microstructures closely resembling those of the true eutectics. Hence, there is in this alloy system, considerabe latitude in varying the properties of the composites by changing the overall composition of the alloys, without losing castability or changing the basic morphology of the cast structure derived from the pseudobinary eutectic or near-eutectic reaction. There is considerably less freedom in varying the compositions of the Zr-W-C and Hf-W-C alloy systems and in both of the latter systems it has been found that solidification occurs over a relatively wide temperature range where the compositions are off more than approximately 10 atomic percent to the zirconium or hafnium side of the pseudo-binary eutectic. Hence, the microstructure of the latter two systems if provided with too much of zirconium or hafnium will have a coarser grain structure and the composites will be less suitable for tooling applications.

Other advantages of the invention will be apparent from the following detailed descriptions and drawings in which.

Figure 1:
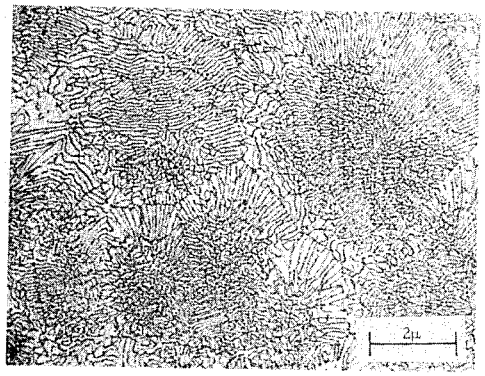
FIG. 1 is a photomicrograph of a typical Group IVa metal (in this instance titanium)-tungsten-carbon system (Ti(21)-W(57)-C(22) atomic percent) taken at a magnification of 1000.
Figure 2:
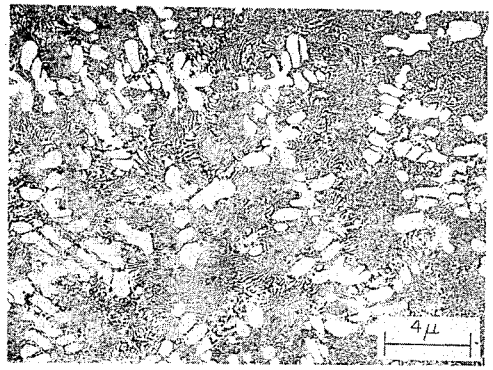
FIG. 2 is a photomicrograph at a magnification of 500 of a second Group IVa metal-tungsten-carbon system of somewhat different composition (Ti(23)-W(52)-C(25) atomic percent) wherein there are grains of primary carbide dispersed throughout the lamellar microstructure.

The carbide composites of the invention are preferably prepared by melting and casting to produce the fine-grain, lamellar microstructure of monocarbide phase and refractory metal phase formed through solidification of an eutectic or near-eutectic liquid. A typical fine-grain, lamellar microstructure of the invention is illustrated in FIG. 1 where metal is dark and carbide light. The photomicrograph of that figure, while showing a titanium-tungsten-carbon system, is typical of the lamellar microstructure of all three base alloy systems of the invention. For carbide cutting tool applications it has been found desirable to have grains of primary carbide dispersed throughout the lamellar microstructure as seen in FIG. 2. The photomicrographs of the hafnium and zirconium systems are like those of FIGS. 1 and 2. The presence of the grains of primary carbide in the lamellar structure significantly improve the use of the carbide composite for machine tool purposes.

Figure 4:
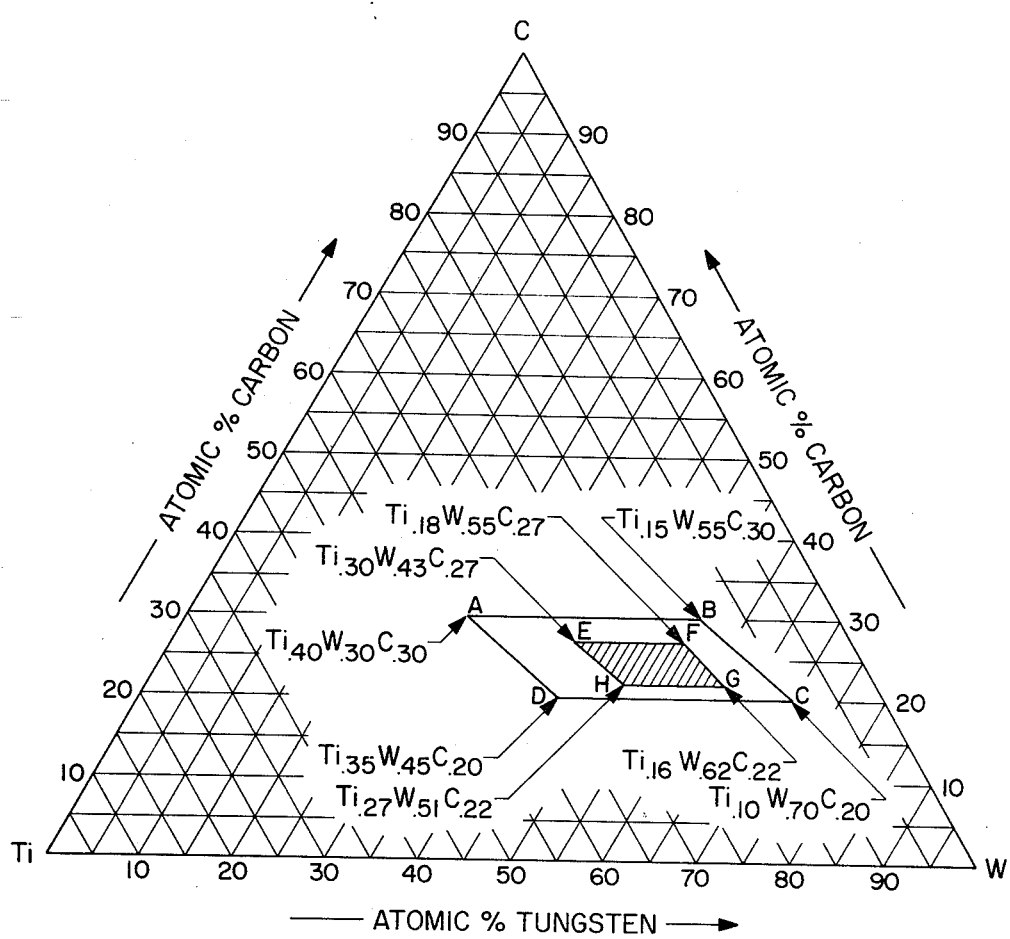
FIG. 4 is a composition ternary showing desired composition areas for Ti-W-C base alloys of the invention.
Figure 5:
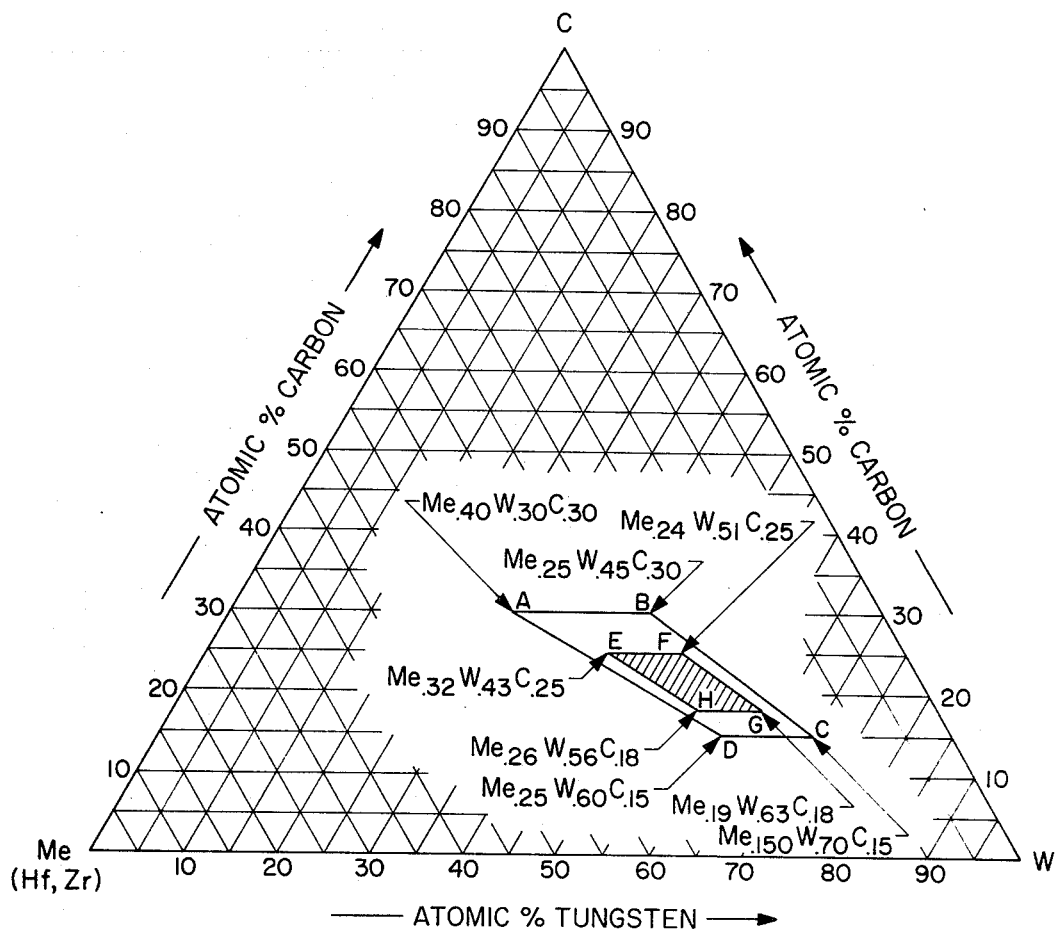
FIG. 5 is a composition ternary showing desired composition areas for Zr-W-C and Hf-W-C base alloys of the invention.

The ternary diagrams of FIGS. 4 and 5 depict suitable base alloy compositions for producing the carbide composites of the invention. Referring to FIG. 4 which is concerned with titanium-tungsten-carbon base alloys, the preferred compositions fall within the inner hatched area E, F, G, H. The larger area A, B, C, D includes compositions of generally less suitable composites but which are acceptable for some applications. Similarly, the inner hatched area of E, F, G, H of FIG. 5 depicts the more desirable compositions of either the hafnium or zirconium systems. The larger enclosed area A, B, C, D includes composites generally less suitable but still of a useful nature. The lamellar microstructures of the preferred areas E, F, G, H of FIGS. 4 and 5 include grains of primary carbide dispersed throughout the microstructure. These primary carbide grains enhance the cutting characteristics of the composites when used in machine tools; however, too much of the primary carbide grains promotes chipping of the machine tool. Compositions falling within the general areas A, B, C, D above the preferred areas E, F, G, H will have some tendency to chip. Such is tolerable for some machine tool applications and not objectionable at all for other applications where high hardness and abrasive resistance are required. Below the preferred areas E, F, G, H and within the general areas A, B, C, D of FIGS. 4 and 5 there is a tendency for primary metal grains to form within the lamellar microstructure. Primary metal lessens the value of the carbide composite where used for cutting tools. To the right of the preferred areas E, F, G, H of both FIGS. 4 and 5 and within the general areas A, B, C, D there is a tendency for subcarbide grains to form within the lamellar microstructure. Subcarbides are less hard than monocarbides and, therefore, less suitable for machining applications. The inner hatched areas E, F, G, H of FIGS. 4 and 5 contain the primary carbide grains in desired amounts for most machine tool purposes.

Melting and casting, plasma-arc spraying, as well as powder-metallurgical methods have been employed in preparing metal and monocarbide composites based on the alloy systems Ti-W-C, Zr-W-C and Hf-W-C of the invention. Melting and casting into chilled molds have produced composites with the best mechanical properties and performance as tool materials. Experience indicates that skull melting, using either a non-consumable (tungsten) or consumable electrode arc technique, to be the most efficient and reliable method for obtaining the melts needed for casting. Melting of the charges in resistively or inductively heated graphite containers has been proven feasible for Ti-W-C base alloys, although care has to be exercised to avoid excessive carbon pick-up upon prolonged exposure of the alloys to hypereutectic temperatures. Continuous melting of presintered compacts in the field of an eddy-curent concentrator, or resistance heating and melting of alloy charges in an arrangement where the container is formed by a solidified portion of the alloy to be melted, appear to be promising techniques.

Centrifugal casting of the melt is preferable to casting techniques employing stationary molds, because the former casting techniques minimize the problems associated with the formation of shrinkage pipes and, as the result of the high casting speeds, allows complex parts to be cast to shape.

Other uses of the alloys of the invention are many including hard facings for plows, bulldozer blades, bearings, and for penetrator cores for armor-piercing projectiles. Application of hard facings to various shaped objects by plasma melting and spraying of the powdered alloys of the invention, has been proven feasible. The plasma-arc spraying technique further holds promise for preparing extremely rapid chilled, and thus very-fine-grained, alloying powders, which then can be consolidated into shapes by powder-metallurgical techniques.

It is important in whatever manner of fabrication that is employed that the eutectic or near-eutectic liquid phase be rapidly cooled, preferably at a temperature of the particular system in order to assure the formation of the fine-grained, lamellar microstructure of the invention.

Dense bodies can also be prepared from powdered material by hot pressing and also by cold pressing and sintering, preferably with additions of sintering aids. The powders can comprise the carbides and metals mixed in the desired quantities, but preferably the powders should be pre-alloyed materials prepared by comminution of melted and rapidly cooled alloys. The iron group metals or their alloys, as well as manganese and copper-containing alloys, may be used as sintering aids. Among these, nickel or nickel-iron alloys seem to afford the best properties in terms of toughness and shock-resistance, but as cutting tools, the sintered materials are inferior to the cast alloys.

Alloying of the Group IVa metal (Ti, Zr, and Hf)-W-C base alloys of the invention The ternary alloys from all three base systems of the invention can be extensively modified by alloying additions of other metals. Alloying results, in some instances, in considerable improvement of performance. The studies of the effect of alloy compositions, upon performance as a cutting tool in turning 347 stainless steel are summarized as follows:

(1) Ti-W-C base tools had the best cutting performance in terms of tool life. The optimum composition in this base system lies at, or near, the composition Ti-W-C (23-52-25 atomic percent) which is slightly hypereutectic. Alloys located to the tungsten side of the pseudobinary eutectic have slightly higher wear rates than the optimum composition, but also have somewhat higher edge-stability and cracking resistance. Alloys located to the titanium side of the eutectic have good wear characteristics, but tend to chip-welding at high cutting speeds. Alloys with more than 28 atomic percent carbon are prone to edge-chipping. Alloys with less than 22 atomic percent carbon are hypoeutectic, contain primary metal-phase and are subject to high wear.

(2) Tungsten may be partially replaced by molybdenum (for instance, up to 20 atomic percent of the base alloy system) without impairing performance. Small quantities of chromium (up to 10 atomic percent of the base alloy system) also may be substituted for tungsten, but larger quantities result in embrittlement of the composites.

(3) The Group IVa metals may be interchanged for each other in any ratio in their respective base alloy systems. Low level alloying (1 to 5 atomic percent) of the Ti-W-C system with Zr or Hf increases the tool life; still higher concentrations result in a gradual drop-off of performance to the levels observed for ternary Zr-W-C or Hf-W-C alloys. Generally speaking, alloying Group IVa metal or metals will not be substituted in an amount in excess of 20 atomic percent of the base alloy system. More typically, the alloying Group IVa metal or metals will comprise not more than 5 atomic percent of the base alloy system.

(4) Substitution of vanadium for tungsten in quantities up to 10 atomic percent of the base alloy system decreases the cracking sensitivity, but somewhat impairs performance and edge strength. Edge-chipping tendency is increased by additions of more than 5 atomic percent niobium or tantalum, although cratering and chip-welding characteristics appear improved. On the overall, the addition of Group IVa metals in quantities of more than 5 atomic percent (preferably, not more than 2 atomic percent) is not recommended.

(5) No significant change in cutting uerformance was observed upon substituting up to 10 atomic percent rhenium for tungsten. Substitution of rhenium up to 20 atomic percent for tungsten appears acceptable.

(6) Low level additions of iron group metals (Co, Ni, Fe), of manganese and copper, and of rare earth metals in quantities less than 3 atomic percent of the carbide composite of the invention were found to be essentially inert.

(7) Eutectic, or slightly hypereutectic, Zr-W-C and Hf-W-C based alloys, are tougher than Ti-W-C based alloys, but were found to have higher wear-rates in cutting tool applications.

The base alloy systems of the invention including the beneficial alloying metals will typically comprise at least 90 atomic percent of the carbide composite. Generally speaking, the atomic percent of inerts is held to be less than 3 to 5 atomic percent of the carbide composite.

The refractory metal phase of the lamellar microstructure of the invention will typically have a melting point around 2700° C. which is a decided improvement over the 1400° C. melting temperature of the conventional cobalt cutting tool.

The rate of cooling of the alloy of the invention during its fabrication determines grain size. Desirably, cooling is accomplished at a rate of at least 20° C. per second to obtain a generally fine grain. Cooling at a slower rate gives a product with a coarser grain. Preferably, cooling is at a rate of more than 30° C. per second.

Preliminary test results indicate transverse rupture strength levels for the cast Ti-W-C eutectic structure in the range from 220,000 p.s.i. and probably extending to above 350,000 p.s.i., depending upon fabrication conditions.

The majority of tests have been carried out in studying the performance of the alloys as cutting tools in straight turning of cylindrical test bars on a Le Blonde machineability lathe. For these tests, the carbide alloys were either machined into inserts suitable for clamping in standard tool holders, or more or less irregular shaped bits were brazed onto steel tool holders and then ground on a K. O. Lee diamond grinder to the desired geometry. The test material consisted of annealed 347 stainless steel in the form of 3 inch diameter x 18 inch long cylindrical bars. The surface was removed to a depth of .050 inch prior to testing the experimental alloys. In the standard test, the steel was cut at 400 surface feet per minute (s.f.m.), using a depth of cut of 50 mils and a feed of 10 mils per revolution. The tool geometry for the standard test was as follows: back rake, 0°; side rake, 5°; side relief 5°; end relief, 5°; side clearance end angle, 25°.

A number of representative commercial cutting tools were evaluated under conditions described above. In addition to the examples below, a selected list of additional tests is contained in Table II.

Figure 3:
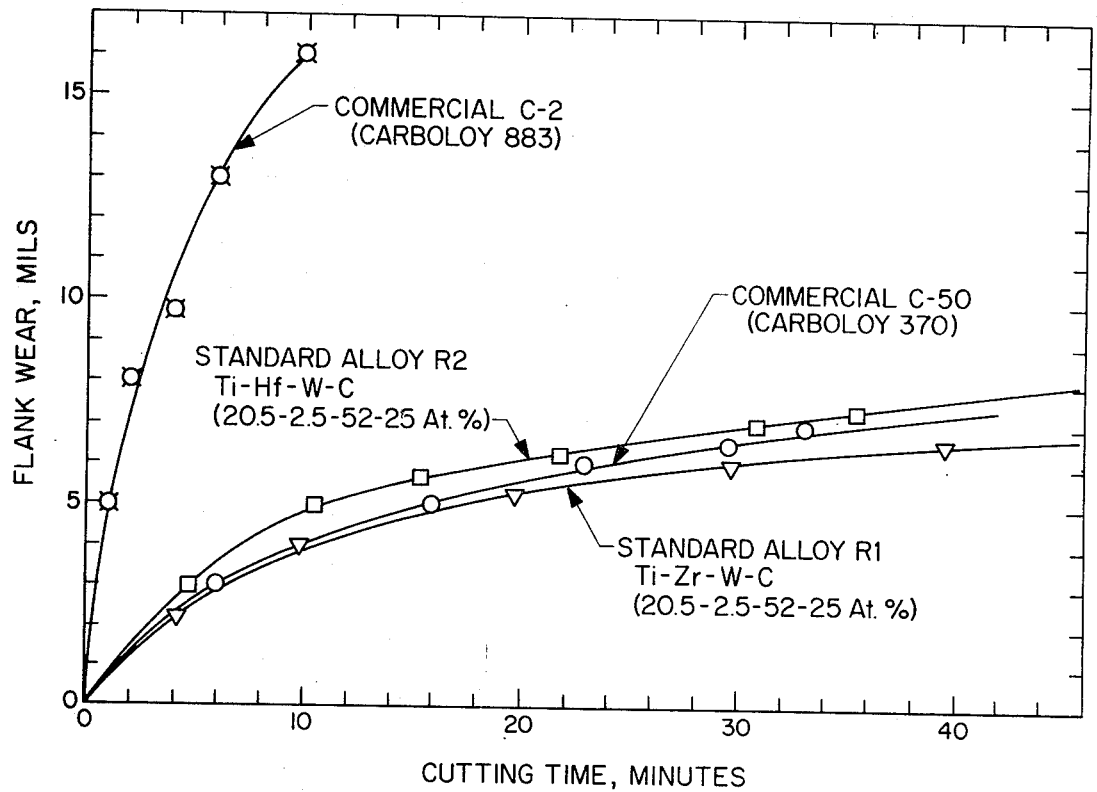
FIG. 3 is a graph presenting typical comparative wear curves obtained in turning 347 stainless steel with the cast alloy tools of the invention and top grade C-2 and C-50 type commercial carbides.

FIG. 3 depicts graphically the comparative wear curves obtained in the turning of 347 stainless steel with the cast alloy tools of the invention and top grade C-2 and C-50 type commercial carbides. It will be seen that the cast alloyed tools of the invention have equivalent wear resistance to the top grade wear resistant C-50 tools. In addition, it has been shown that the tools of the invention have equivalent toughness to that of the C-2 tools. Therefore, the cast tools of the invention combine the best qualities of the tough C-2 tools and the wear resistant C-50 tool.

EXAMPLE I

A button of an alloy Ti-W-C (19-58-23 atomic percent) was prepared by arc melting in a non-consumable electrode arc furnace under helium at ½ atmosphere pressure and the melt was allowed to solidify on the water-cooled copper hearth. Metallographic examination of the alloy showed very small amounts of primary monocarbide grains in an eutectic lamellar matrix. The average lamellae width of the eutectic structure was about one micron. The hardness was $R_A=86$. The tool was brazed onto a mild steel tool holder, ground to the standard tool geometry, and tested in turning 347 stainless steel with the standard conditions outlined above. The tool life, based on a flank wear of .016 inch was 45 minutes; the tool showed a local wear (crater) of .028 inch at the end of the cutting flank.

EXAMPLE II

An alloy Ti-Zr-W-C (20.5)-2.5)-52-25 atomic percent) (standard alloy R1 in FIG. 3) was prepared in the same way as the sample described under Example I. The composite had a hardness of $R_A=87$ and the metallographic examination showed small amounts of primary monocarbide in an eutectic matrix (substantially identical to the microstructure shown in photomicrograph of FIG. 2). The average lamellae width of the eutectic was about 0.4 micron. The heterogeneous matrix of the photomicrograph of FIG. 2 is an eutectic of metal plus carbide and the white or light islands are primary carbide. A uniform wear rate of .07 mil per minute was derived from a 40-minute turning test of 347 stainless steel with aforesaid standard conditions, yielding an extrapolated tool life of 190 minutes (.016 inch flank wear). Cratering of the tool after 40 minutes cutting time was negligible.

EXAMPLE III

An arc cast alloy Hf-W-C (27-51-22 atomic percent) containing a small amount of primary carbide grains besides the eutectic lamellar microstructure was prepared. Tool life in the standard test on 347 stainless steel was 15 minutes, with the tool showing negligible cratering or edge wear at the end of the test.

EXAMPLE IV

The alloy cited under Example II and another arc cast alloy Ti-Hf-W-C (20.5-2.5-52-25 atomic percent) were tested for edge stability by gradually increasing the feeds while maintaining a surface speed of 400 feet/min. and a cutting depth of .050 inch. Both tools performed reliably at feeds up to .050 inch per revolution. At still higher feeds, the tool edges showed signs of chipping.

EXAMPLE V

The behavior of the cast carbide tooling materials at high depth of cut were established in another test run using the same alloys as listed under Example IV with a cutting speed of 400 s.f.m. (surface feet per minute). A constant cutting depth of ¼ inch was maintained in the experiments, while the feed was gradually increased, starting at .005 inch per revolution. No breakdown occurred at feeds up to .030 inch/rev., after which the experiment had to be stopped due to lack of lathe power.

EXAMPLE VI

An arc cast alloy Ti-W-C (19-58-23 atomic percent) was comminuted to a grain size below 50 microns and thoroughly mixed with 3 weight percent nickel powder. The mixture was cold-compacted at 4 tons/square inch in steel dies and then sintered for 1 hour at 1500° C. under vacuum. The metallographic examination showed a dense structure consisting of rounded monocarbide grains embedded in a metallic matrix. Tool life in the standard turning test on 347 stainless steel was 14 minutes. The tool had higher crater wear than the cast alloy of the same composition.

EXAMPLE VII

A composite tool was fabricated by facing one edge of an M-2 tool steel insert with a .080 inch wide x .20 inch long x .050 inch thick platelet of the cast standard alloy R1, Ti-Zr-W-C (20.5-2.5-52-25 atomic percent). The carbide tip was attached to the steel insert by brazing. The performance of this composite tool under the standard test condition on 347 stainless steel was found to be the same as the solid carbide inserts; however, as a result of the lower thermal conductivity of the tool steel base compared to the cast carbide alloys, higher tip temperatures, and, as a consequence, higher wear rates were observed on the composite insert as the total load on the tool was increased by either increasing the depth of cut or the feed.

TABLE II

[Selected list of test data obtained on cast Ti(Zr,Hf)-W-C alloys, and on commercial C-2 and C-50 grade carbides, in turning 347 stainless steel [1]]

| | $W_b$ | $T_b$ | $W_u$ | $T_l$ | Remarks |
|---|---|---|---|---|---|
| Alloy composition, atomic percent: | | | | | |
| Ti(26)-W(51)-C(23) | 5 | 3 | .14 | 65 | Slight welding tendency. |
| Ti(21)-W(56)-C(23) | 4 | 4 | .25 | 65 | |
| Ti(20)-W(55)-C(25) | 3 | 3 | .13 | 110 | |
| Ti(23)-W(52)-C(25) | 3 | 5 | .16 | 75 | |
| Ti(26)-W(49)-C(25) | 4 | 6 | .09 | 160 | |
| Ti(25)-W(48)-C(27) | 4 | 5 | .06 | 160 | Slight chipping tendency. |
| Ti(22)-W(51)-C(27) | 4 | 4 | .10 | 110 | |
| Ti(23.5)-Zr(2.5)W(49)-C(25) | 4 | 5 | .07 | 160 | |
| Ti(17.5)Zr(2.5)-W(55)-C(25) | 4 | 4 | .16 | 75 | |
| Ti(20.5)-Zr(2.5)-W(52)-C(25) | 4 | 8 | .07 | 190 | Alloy R1. |
| Ti(20.5)-Hf(2.5)-W(52)-C(25) | 5 | 8 | .08 | 130 | Alloy R2. |
| Ti(23)-Ta(2.5)-W(51.5)-C(23) | 7 | 5 | .19 | 65 | Slight chipping tendency. |
| Hf(22)-W(60)-C(18) | 6 | 5 | .44 | 25 | |
| Hf(25)-W(55)-C(20) | 4 | 4 | .25 | 50 | |
| Hf(25)-W(48)-C(27) | 4 | 4 | .25 | 50 | |
| Zr(25)-W(55)-C(20) | 7 | 4 | .70 | 20 | |
| Zr(28)-W(47)-C(28) | 6 | 5 | .30 | 40 | |
| Commercial alloys: | | | | | |
| Carboloy 370 (C-50 type) | 3 | 3 | .08 | 160 | |
| Carboloy 883 (C-2 type) | | | 1.10 | 10 | |

[1] Data shown are for specific heats of stainless steel. Results will vary from heat to heat for stainless steels of the same specification comparative ranking will remain as shown.

LEGEND.—$W_b$ = Break-in wear, mils; $T_b$ = Break-in time, minutes; $W_u$ = Uniform wear rate, mils per minute; $T_l$ = Extrapolated tools life in minutes for 0.016 inch wear.

What is claimed is:
1. A cast carbide composition consisting essentially of:
from about 20 to about 30 a/o carbon;
from about 10 to about 40 a/o titanium;
the balance being tungsten;
said composition having a fine-grained, lamellar microstructure derived from an essentially psuedobinary eutectic composition, said lamellar microstructure consisting of a monocarbide phase and a metal phase, said metal phase being rich in tungsten and contributing toughness to the composition, and said monocarbide phase being a solid solution of monocarbides of tungsten and titanium.

2. A cast carbide composition as in claim 1 wherein the carbon content is from about 22 to about 27 a/o and the titanium content is from about 16 to about 30 a/o.

3. A cast carbide composition as in claim 1 wherein at least one material taken from the group consisting of molybdenum, chromium and rhenium is substituted for said tungsten, said molybdenum or rhenium content being in the range of from 0 to about 20 a/o, said chromium content being in the range of from 0 to about 10 a/o, said tungsten remaining in the composition being not less than 10 a/o.

4. A cast carbide composition as in claim 2 wherein at least one material taken from the group consisting of molybdenum, chromium and rhenium is substituted for said tungsten, said molybdenum or rhenium content being in the range of from 0 to about 20 a/o, said chromium content being in the range of from 0 to about 10 a/o, said tungsten remaining in the composition being not less than 10 a/o.

5. A cast carbide composition consisting essentially of:
from about 20 to about 30 a/o carbon;
from about 10 to about 40 a/o of titanium;
from about 0 to about 20 a/o of at least one material taken from the group consisting of rhenium and molybdenum;
from about 0 to about 5 a/o of at least one material taken from the group consisting of vanadium, niobium and tantalum;
from about 0 to about 10 a/o chromium;
the balance, but not less than about 10 a/o, being tungsten;
said composition having a fine-grained lamellar microstructure derived from an essentially pseudobinary eutectic composition, said lamellar microstructure consisting of a monocarbide phase and a metal phase, said metal phase being rich in tungsten and contributing toughness to the composition, and said monocarbide phase being a solid solution of monocarbides of tungsten and titanium.

6. A cast carbide composition as in claim 5 wherein the carbon content is from about 22 to about 27 a/o and the titanium content is from about 16 to about 30 a/o.

References Cited

UNITED STATES PATENTS

| | | | |
|---|---|---|---|
| 1,774,849 | 9/1930 | Schroter | 75—176 |
| 1,893,144 | 1/1933 | Kropf | 75—176 |
| 2,027,763 | 1/1936 | Boecker | 75—176 |
| 2,074,847 | 3/1937 | Lemaigre | 75—176 |
| 2,124,020 | 7/1938 | Wirth | 75—176 X |
| 2,253,476 | 8/1941 | Wirth | 75—176 X |
| 2,977,225 | 3/1961 | Wlodek et al. | 75—176 |
| 3,116,145 | 12/1963 | Semchyshen | 75—176 |
| 3,124,452 | 3/1964 | Kraft | 75—135 |
| 3,528,808 | 9/1970 | Lemkey et al. | 75—135 X |
| 3,542,541 | 11/1970 | Lemkey | 75—135 X |
| 3,554,737 | 1/1971 | Foster et al. | 75—176 X |

OTHER REFERENCES

Z Metallkunde, Nowotny et al., 1945, pp. 97–101.
Nuclear Science Abstracts, No. 23063, pp. 2836–37, vol. 19, No. 12, June 30, 1965; No. 37119, pp. 4633–34, vol. 19, No. 19, Oct. 15, 1965.

CHARLES N. LOVELL, Primary Examiner

U.S. Cl. X.R.

29—182.7, 182.8